United States Patent [19]

Panusch et al.

[11] 3,928,318

[45] Dec. 23, 1975

[54] PROCESS FOR MAKING METHYL GLUCOSIDE

[75] Inventors: Erwin Panusch, Livermore; Igor Sobolev, Orinda, both of Calif.

[73] Assignee: Kaiser Aluminum & Chemical Corporation, Oakland, Calif.

[22] Filed: Nov. 1, 1974

[21] Appl. No.: 520,180

[52] U.S. Cl. ............................................. 260/210 R
[51] Int. Cl.² ........................................ C07H 15/04
[58] Field of Search ................................ 260/210 R

[56] References Cited
UNITED STATES PATENTS

| | | | |
|---|---|---|---|
| 2,606,186 | 8/1952 | Dean et al. | 260/210 R |
| 2,715,121 | 8/1955 | Glen et al. | 260/210 R |
| 3,375,243 | 3/1968 | Nevin et al. | 260/210 R |

*Primary Examiner*—Johnnie R. Brown
*Attorney, Agent, or Firm*—Paul E. Calrow; Andrew E. Barlay

[57] ABSTRACT

Methyl glucoside of low residual glucose content is directly made from glucose by methylating glucose with methanol in the presence of an acid catalyst and anhydrous, hydratable $CaSO_4$. The produced methyl glucoside contains less than about 1% residual glucose and can be used without requiring removal of the residual glucose content.

6 Claims, No Drawings

PROCESS FOR MAKING METHYL GLUCOSIDE

BACKGROUND OF THE INVENTION

Methyl glucoside has been widely employed in the preparation of nonionic surfactants and it has also been used as a plasticizer for phenolic and alkyd resins. One of the most common methods for the preparation of methyl glucoside involves methylation of glucose with methanol in the presence of an acid catalyst. Generally, the reaction between glucose and absolute methanol in the presence of an acid catalyst proceeds according to the following reaction:

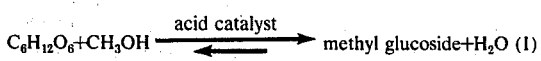

$$C_6H_{12}O_6 + CH_3OH \xrightleftharpoons{\text{acid catalyst}} \text{methyl glucoside} + H_2O \quad (I)$$

The reaction between glucose and methanol produces water which tends to hydrolyze the already formed methyl glucoside to the initial glucose and methanol. Consequently, the reaction between glucose and methanol becomes an equilibrium reaction and normally the product methyl glucoside will always contain a quantity of residual glucose. The presence of residual glucose in methyl glucoside is undesirable since it can cause objectionable side reactions when the methyl glucoside is used as a plasticizer, or it can detrimentally affect color stability and other properties of nonionic surfactants made from methyl glucoside.

To obtain the highest possible methyl glucoside yield with the lowest residual glucose content, several processes have already been suggested. As has been shown in U.S. Pat. No. 2,276,621 (Mar. 17, 1942), the reaction product of carbohydrate-methanol reaction is stripped to remove excess methanol and the water formed during the reaction. Evaporation will cause the crystallization of methyl glucoside, which is then separated from the mother liquor. Crystallization is a time-consuming process step, however, and methyl glucoside losses are unavoidable.

It has also been suggested in U.S. Pat. No. 3,450,690 (June 17, 1969) that the residual reducing sugar content, i.e., the residual glucose content from the glucose-methanol reaction, can be eliminated by treating the product mixture from the glucose-methanol reaction with an alkaline agent, such as KOH, NaOH, Ba(OH)$_2$, CaO or Ca(OH)$_2$ in the range of 50°C to 200°C at a pH of at least 8 to permit conversion of the residual reducing sugar content to an easily separable form. Subsequent to the alkaline treatment, the impurities, present in solid form, are removed for example by filtration and the purified methyl glucoside can then be directly employed for any desired purpose. While this treatment results in a high purity product, this purification process involves several steps which significantly increase the cost of making pure methyl glucoside even if the time required for the purification is not considered.

Other methods have also been suggested to obtain high yields of methyl glucoside, which may or may not eliminate, but at least reduce the time required for the purification of the produced methyl glucoside. One of these processes, as described in U.S. Pat. No. 3,565,885 (Feb. 23, 1971), involves the reaction of the carbohydrate with excess alcohol in the presence of an acid catalyst. At the end of the reaction, the product mixture is neutralized, a portion of the alcohol is replaced by water, and then this mixture is conducted through an anion ion exchange resin column which will remove the residual impurities. The product obtained from the column is then subjected to crystallization to recover methyl glucoside. This process, while capable of yielding a high purity product, requires the use of an anionic exchange resin column and such use is generally accompanied with high costs, such as the initial investment in the ion exchange resin coupled with the cost of regeneration of the exhausted resin.

Thus, it can be seen that the prior art processes employed for the preparation of methyl glucoside involve extensive and expensive purification processes and that there is a need for a method which eliminates these time-consuming and uneconomical process steps.

It has now been discovered that high purity methyl glucoside can be readily produced from glucose without requiring extensive purification of the reaction product of glucose and absolute methanol in the presence of an acid catalyst and anhydrous, hydratable CaSO$_4$.

SUMMARY OF THE INVENTION

Methyl glucoside containing less than about 1% by weight residual reducing carbohydrate is produced from glucose by reacting glucose with methanol in the presence of an acid catalyst and anhydrous, hydratable CaSO$_4$. The quantity of hydratable CaSO$_4$ incorporated in the acid catalyzed glucose-methanol reaction is selected within the CaSO$_4$:glucose weight ratio of about 1:1 to 3:1. Suitably, as acid catalyst, concentrated (95% or above by weight) sulfuric acid is employed.

DETAILED DESCRIPTION OF THE INVENTION

Methyl glucoside containing less than about 1% by weight residual reducing carbohydrate is made by reacting glucose with methanol in the presence of an acid catalyst and anhydrous, hydratable CaSO$_4$.

For the purposes of this invention, the term "residual reducing carbohydrate" means any reducing carbohydrate remaining in the reaction mixture after the completion of the reaction between glucose and absolute methanol, whether being unreacted glucose or being a reducing carbohydrate generated by hydrolysis of the already produced methyl glucoside.

The expression "anhydrous and/or hydratable CaSO$_4$" as employed in the instant specification and claims refers to CaSO$_4$ which has been produced from CaSO$_4$·2H$_2$O (gypsum) or CaSO$_4$·½H$_2$O (plaster of Paris) by controlled dehydration and which is capable of rehydration in the presence of water. Thus, this expression, as used herein, excludes any CaSO$_4$ which does not exhibit rehydration characteristics, but includes anhydrous CaSO$_4$, such as active or soluble anhydrite, which is capable of rehydration to at least CaSO$_4$·½H$_2$O, the hemihydrate.

Preferably, the anhydrous CaSO$_4$ employed in the process of the instant invention is free of CaO and other impurities and when dispersed in water, the pH of the dispersion should be preferably less than 8.5. If a slightly alkaline CaSO$_4$ (of the type found in certain natural gypsum deposits) is used, additional acid catalyst must be employed which will compensate for this alkalinity. Use of highly alkaline CaSO$_4$ is not recommended.

In the preparation of methyl glucoside in accordance with the invention, glucose is contacted with methanol. Suitably, both the glucose and the methanol used are free of water, since the methyl glucoside formation itself produces water and the presence of water in the initial reactants can result in premature termination of the methyl glucoside formation due to the equilibrium reaction shown above.

The amount of methanol employed in methyl glucoside production should be at least stoichiometric, i.e. at least one mole of methanol should be provided for each mole of glucose. For best results, however, an excess over the stoichiometric quantity required is utilized. Generally, the methanol quantities employed are 10–300% in excess of the required quantity, although larger amounts can also be used without detrimentally affecting the methyl glucoside formation.

Conversion of the glucose to methyl glucoside is accomplished by using an acid catalyst. Any of the acid catalysts recommended by the prior art can be successfully utilized, for example $H_2SO_4$, HCl or organic acids soluble in methanol can be used; for best results, however, the use of $H_2SO_4$ is recommended. The quantity of acid catalyst employed is generally in the range of 0.5–10% by weight of glucose. In the instant process when $H_2SO_4$ is utilized as the catalyst, $H_2SO_4$ (95% conc. or above) quantities in the range of about 1–3% by weight of glucose are advantageously used.

The acid catalyst can be added either to the mixture of glucose and methanol, or if desired the acid can be admixed with the methanol prior to the addition of the methanol to glucose.

Subsequently or simultaneously anhydrous $CaSO_4$ is incorporated in the reaction mixture. The quantity of hydratable $CaSO_4$ added to the reaction mixture is advantageously kept to at least a 1:1 $CaSO_4$:glucose weight ratio. For optimum results the $CaSO_4$:glucose weight ratio is selected to be within the range of about 1:1 to 3:1, preferably within the range of 1:1 to 2:1. The $CaSO_4$ added to the reaction mixture can be in powder form or as particulate matter and care is to be taken that it is substantially uniformly distributed in the reaction mixture during the methyl glucoside formation step.

The reaction between the glucose and methanol in the presence of the acid catalyst and the anhydrous $CaSO_4$ is generally conducted under the same conditions as in the prior art. For example, it is known to conduct the reaction at a temperature in excess of about 50°C, in a closed container under pressure and under agitation. Temperatures up to about 200°C can be employed; preferably the reaction is conducted within the temperature range of about 100°–150°C in a closed vessel. Formation of the methyl glucoside can be readily followed by measuring the optical rotation of the reaction mixture. Heating is terminated when the specific optical rotation of the mixture remains constant at or about the value of $[\alpha]_D^{20} = 90°$. Also, the conversion of glucose can be measured by the well known Fehling's reaction. The methyl glucoside produced in the reaction is a mixture of the alpha and beta isomers.

When the conversion of glucose to methyl glucoside ceases, the mixture is cooled below 100°C, preferably below about 65°C, which is the boiling point of methanol. To the cooled mixture a base is added to neutralize the acid catalyst. Preferably, the salt formed by neutralization of the acid catalyst should be insoluble in the reaction mixture.

In the case where $H_2SO_4$ has been used as the acid catalyst, addition of an aqueous dispersion of $Mg(OH)_2$, $Ca(OH)_2$, $Ba(OH)_2$, $Sr(OH)_2$, mixtures thereof, or similar bases is recommended. The salt formed by the reaction of the sulfuric acid catalyst and these bases will be insoluble in the reaction mixture and thus easily removable. The quantity of base, generally incorporated in the mixture as an aqueous dispersion, should be at least sufficient to neutralize the free acid. To assure complete neutralization sufficient base is added to obtain an apparent pH in excess of 8, generally in the range of 9–10.

Subsequently, the reaction mixture is freed of solids. Conveniently this is accomplished by filtration, although other well known methods, for example centrifugation, can also be employed. When the reaction mixture is filtered, the solid residue remaining on the filter is washed with methanol to remove trace quantities of methyl glucoside from the solid residue. The filtrate is then diluted with water and the methanol is removed by stripping, preferably under vacuum.

The residue from stripping is an aqueous solution of methyl glucoside, which can be employed directly or if desired, methyl glucoside free of water can be readily obtained by evaporation of the original, filtered methanolic product solution to dryness.

The reducing carbohydrate content of the methyl glucoside produced in this manner is generally less than 1% by weight. This low reducing carbohydrate content renders the produced methyl glucoside directly usable for most purposes without any additional purification.

The following example will further illustrate the advantages of the instant process.

EXAMPLE

A. In a stainless steel reactor 300 parts by weight absolute methanol were charged together with 100 parts by weight glucose, 100 parts by weight of $CaSO_4$ (anhydrous) and 1.2 parts by weight $H_2SO_4$ (98% by weight). The reaction mixture was heated under agitation to 110°C and kept at this temperature for about 2 hours. Periodically, samples were taken from the reaction mixture and the glucose content was determined using Fehling's solution [as described in Lange's Handbook of Chemistry, Tenth Edition, page 1051 (1961)]. When the glucose content was found to be below about 1% by weight of the produced methyl glucoside (after about 100 minutes), heating was continued for an additional 20 minutes and then the reaction mixture was cooled to below 60°C. An aqueous dispersion of $Ca(OH)_2$ was then added to the cooled mixture in an amount sufficient to provide about 0.8% by weight $Ca(OH)_2$ based on the weight of glucose charged. The pH of the reaction mixture was found to be about 9.5. Subsequently, the mixture was filtered, then washed with 100 parts by weight of methanol based on 100 parts of glucose charge. The filtrate was then diluted with 55 parts by weight water/100 parts by weight glucose charge and then vacuum stripped at 30°–40°C. The recovered methanol, after purification, was recycled to the reactor. The produced aqueous methyl glucoside solution contained about 60% by weight methyl glucoside having a glucose content of 0.6% by weight based on methyl glucoside. The yield of methyl glucoside was in excess of 98%.

B. The process described under (A) was repeated with anhydrous $CaSO_4$ produced by drying of commercial, nearly neutral gypsum ($CaSO_4.2H_2O$) at 230°C. The product was methyl glucoside in over 98% yield containing 0.4% by weight residual glucose.

C. The glucose-methanol reaction was also conducted in the absence of any anhydrous $CaSO_4$, using 1.2% $H_2SO_4$ (98% by weight) as acid catalyst. Employing the reaction conditions described under (A) above, the produced methyl glucoside contained 1.5% by weight of residual glucose. The test was repeated several times. The lowest residual glucose content obtained, however, was always found to be in excess of 1.3% by weight. Even when the $H_2SO_4$ catalyst quantity was increased, the residual glucose content could not be reduced below 1.3%.

D. $CaSO_4$ produced by drying of an alkaline sample of commercial gypsum of 250°C was also employed in the reaction of glucose and methanol in the presence of 1.2% $H_2SO_4$ catalyst (based on the glucose charge.) The methyl glucoside produced in this manner (under the conditions described under (A) above) contained 18.8% by weight residual glucose. When the amount of $H_2SO_4$ catalyst was increased to 12.0% by weight (based on glucose charged) and the reaction was repeated, the residual glucose content was still 1.6% (based on the weight of methyl glucoside produced.)

E. Anhydrous $CaSO_4$, produced from another sample of commercial gypsum as described in example (B) above, was used in the glucose methanol reaction under the conditions described in that example. The yield of methyl glucoside was over 98%, and the residual glucose content was 0.8%. The spent, methanol-washed $CaSO_4$ from this reaction was dried for 16 hours at 250°C, then re-used in the process with a fresh charge of glucose, methanol and sulfuric acid catalyst. The yield of methyl glucoside after this first $CaSO_4$ recycle was over 98%, and the residual glucose content was again 0.8%. This procedure was repeated twice more, resulting in a second and third recycle of the same batch of $CaSO_4$. Yields of methyl glucoside were over 98%, and the residual glucose contents were 0.9% in both cases.

F. For comparison purposes other drying agents, capable of hydration, such as commerically available active alumina (sold under the trade name K 201 by Kaiser Aluminum & Chemical Corporation), anhydrous sodium sulfate and silica gel were also employed in the glucose methanol reaction for the production of methyl glucoside. The reaction conditions employed were the same as described under (A) above. The results are shown in the Table below.

Performance of Dehydrating Agents in the Production of Methyl glucoside

| Dehydrating Agent | Dehydrating agent: glucose weight ratio | Residual glucose in methyl glucoside % by weight |
|---|---|---|
| Anhydrous $CaSO_4$ | 1:1 | 0.6 |
| Active alumina | 1:1 | 9.9 |
| Anhyd. $Na_2SO_4$ | 1:1 | 33.0 |
| Silica gel | 1:1 | 4.3 |
| None | — | 1.4 |

Thus, it can be clearly observed that the use of anhydrous, hydratable $CaSO_4$ in the formation of methyl glucoside from glucose and methanol, in the presence of an acid catalyst, provides a unique and novel method resulting in a high purity product containing less than about 1% residual glucose content. This purity cannot, in the absence of extensive purification methods, be obtained by prior art processes.

What is claimed is:

1. In the process of making methyl glucoside by the acid-catalyzed reaction of glucose and methanol the improvement which comprises incorporating in the reaction mixture of glucose, methanol and acid catalyst, anhydrous hydratable $CaSO_4$ in an amount sufficient to provide a $CaSO_4$:glucose weight ratio of at least 1:1, maintaining the reaction mixture within the temperature range of about 50°C and 200°C until formation of methyl glucoside ceases, cooling the reaction mixture, neutralizing the acid catalyst with a base capable of forming a salt of neutralization which is insoluble in the reaction mixture, and recovering methyl glucoside having a residual glucose content of less than about 1% by weight.

2. Process according to claim 1, wherein the $CaSO_4$ is incorporated in the reaction mixture in an amount sufficient to provide a $CaSO_4$:glucose weight ratio from about 1:1 to about 3:1.

3. Process according to claim 1, wherein the $CaSO_4$:glucose weight ratio is from about 1:1 to about 2:1.

4. Process according to claim 1, wherein the acid catalyst is $H_2SO_4$.

5. Process according to claim 4, wherein the base is selected from the group consisting essentially of $Ca(OH)_2$, $Mg(OH)_2$, $Ba(OH)_2$, $Sr(OH)_2$ and mixtures thereof.

6. Process according to claim 1, wherein the reaction is carried out in a closed vessel within the temperature range of about 100°C and 150°C.

* * * * *